United States Patent Office 3,399,264
Patented Aug. 27, 1968

3,399,264
ANTISEPTIC COMPOSITION OF 9-AMINOACRI-
DINE HYDROCHLORIDE AND BENZALKONI-
UM HYDROCHLORIDE
Le Roy J. Hyman, Del-Jay Farm, Chagrin River Road,
Gates Mills, Ohio 44040
No Drawing. Continuation-in-part of application Ser. No.
481,903, Aug. 23, 1965. This application Sept. 12, 1966,
Ser. No. 578,499
1 Claim. (Cl. 424—257)

ABSTRACT OF THE DISCLOSURE

This invention is concerned with an antiseptically synergistic combination of 9-aminoacridine hydrochloride and benzalkonium chloride.

---

This application is a continuation-in-part of Ser. No. 481,903 and the invention relates to an antiseptic composition that is an improvement over that described in my co-pending application Ser. No. 481,903, entitled, Antiseptic Scrub, filed Aug. 23, 1965, now abandoned.

Conducive to a better understanding of the invention, it may be well to point out that to attain skin antisepsis with ordinary soaps, or detergents, requires from five to ten minutes of vigorous scrubbing and copious amounts of water.

In contrast, my formulation provides antisepsis upon contact with the skin.

The primary object of this invention is to provide a soapless, or detergentless, antibacterial composition requiring no water in its use.

Another object is to provide an antibacterial composition, of the type stated, that effectively combats *Escherichia coli*, and therefore can be used for preoperative skin preparation.

A further object is to provide such an antibacterial composition, that provides an antiseptic coating, that is non-toxic and non-irritating to the skin.

It is well known that either 9-aminoacridine hydrochloride or benzalkonium chloride have antibacterial properties to effect antisepsis.

However, when either is used alone, in the concentration required to be sufficiently effective, it has toxic effects upon the human skin that precludes its use as an antiseptic surgical scrub.

If each is used in an extremely low concentration, wherein it is without toxic effect upon the skin, it no longer has the power to effectively kill bacteria of the type with which we are here concerned.

However, I have discovered that when a solution is made containing 0.20%, by weight, of 9-aminoacridine hydrochloride in combination with approximately 0.10%, by weight, of benzalkonium chloride, an unexpected synergistic reaction occurs which provides total inhibition of the growth of *Escherichia coli*; which is not accomplished with either of these two substances, individually, at such low concentrations, while at the same time retaining the non-toxic effect upon the human skin associated with such low concentration.

Laboratory proof of this was carried out by streaking agar plates with *Escherichia coli* bacteria.

When an aqueous solution containing 0.20%, by weight, of 9-aminoacridine hydrochloride was applied to the center of the streaking, full growth of the *Escherichia coli* took place through the entire streak in 24 hours.

Again, when an aqueous solution containing 0.10%, by weight, of benzalkonium chloride was applied to the streaking, full growth of the *Escherichia coli* took place through the entire streak after 24 hours.

However, when the identical two solutions were combined, and then applied to the streaks of *Escherichia coli*, after 24 hours, no growth of the *Escherichia coli* had taken place whatsoever, in that portion of the streaking in which the combined solutions had been applied.

The mixture of these two solutions of 9-aminoacridine hydrochloride and benzalkonium chloride (each in a concentration ineffective to kill *Escherichia coli*, when used alone) acts to effectively kill *Escherichia coli*, while at the same time exhibiting no toxic effect on the normal human skin.

This is a totally unexpected and unpredictable result.

Identical laboratory procedures, using alcohol as the carrier, comprising a solution of 0.20%, by weight, of 9-aminoacridine hydrochloride and 0.10%, by weight, of benzalkonium chloride showed total inhibition of the growth of *Escherichia coli*, again, with no toxic effect on the skin.

A third series of laboratory tests, using ointment as the carrier, with 0.20%, by weight, of 9-aminoacridine hydrochloride and 0.10%, by weight, of benzalkonium chloride, again produced total inhibition of the growth of *Escherichia coli*, with no toxic reaction on the skin.

Thus, the so-formulated antiseptic composition may be prepared in the form of an ointment as well as a liquid, or foam dispensed from aerosol cans. However, the type of packaging forms no part of the invention.

For skin antisepsis, a small amount of the antiseptic composition is poured, sprayed, or spread on the hands. Using the fingers, the so applied coating is worked into all the crevices of the skin and under the finger nails until it vanishes, leaving the skin sterile and antiseptic.

No water rinse, or towels, are necessary.

Even if a second application is thought necessary, the entire "scrub-up" period will take only a few minutes, with the additional advantage that skin antisepsis can be attained at locations away from the conventional scrub-up sink.

It will now be clear that there has been provided an antiseptic composition that will create skin antisepsis without the necessity of using a water rinse, and with no toxic reaction on the skin itself.

I claim:
1. An antiseptic composition consisting essentially of a mixture of 0.20%, by weight of 9-aminoacridine hydrochloride and 0.10%, by weight of benzalkonium chloride in a carrier selected from the group consisting of water, alcohol and an ointment.

References Cited

The Merck Index—Merck and Co., Inc., Rahway, N.J. (1960) 7th ed., pp. 16, 128, 138 and 863.

ALBERT T. MEYERS, *Primary Examiner.*

S. J. FRIEDMAN, *Assistant Examiner.*